United States Patent [19]

Glasell

[11] 4,004,689
[45] Jan. 25, 1977

[54] ARTICLE CARRIER

[76] Inventor: Don Leon Glasell, 331 Kedzie St., Evanston, Ill. 60202

[22] Filed: Oct. 10, 1972

[21] Appl. No.: 296,485

[52] U.S. Cl. ................................ 206/387; 281/31
[51] Int. Cl.² ..................... B65D 85/67; B42D 3/00
[58] Field of Search .......... 206/387, 472, 475, 476, 206/491, DIG. 36; 229/87.5, 92.8, 87 R

[56] References Cited

UNITED STATES PATENTS

| 1,494,006 | 5/1924 | Morrison | 206/457 X |
| 1,985,075 | 12/1934 | Bird | 229/89 |
| 2,973,091 | 2/1961 | Berry | 206/476 X |
| 3,132,744 | 5/1964 | Scharf | 206/45.14 UX |
| 3,294,233 | 12/1966 | Hollinger | 206/491 |
| 3,372,798 | 3/1968 | Thomas | 206/365 X |
| 3,638,788 | 2/1972 | Solomon | 206/387 |
| 3,664,492 | 5/1972 | Wallace | 206/387 |
| 3,747,745 | 7/1973 | Esashi et al. | 206/387 |

FOREIGN PATENTS OR APPLICATIONS 1,173,963 12/1969 United Kingdom ............ 229/87 R Primary Examiner—Leonard Summer

[57] ABSTRACT

This invention relates to a carrier for articles having a protrusion thereon such as a recording tape cassette. A preferred aspect of the invention is to have the carrier made from a single blank which is scored and folded to provide restraining and support members for prohibiting movement of the article along its three major axes. Also, the present invention provides an audiovisual package which comprises visual material and the above described carrier and a blank which is used to prepare the carrier.

3 Claims, 10 Drawing Figures

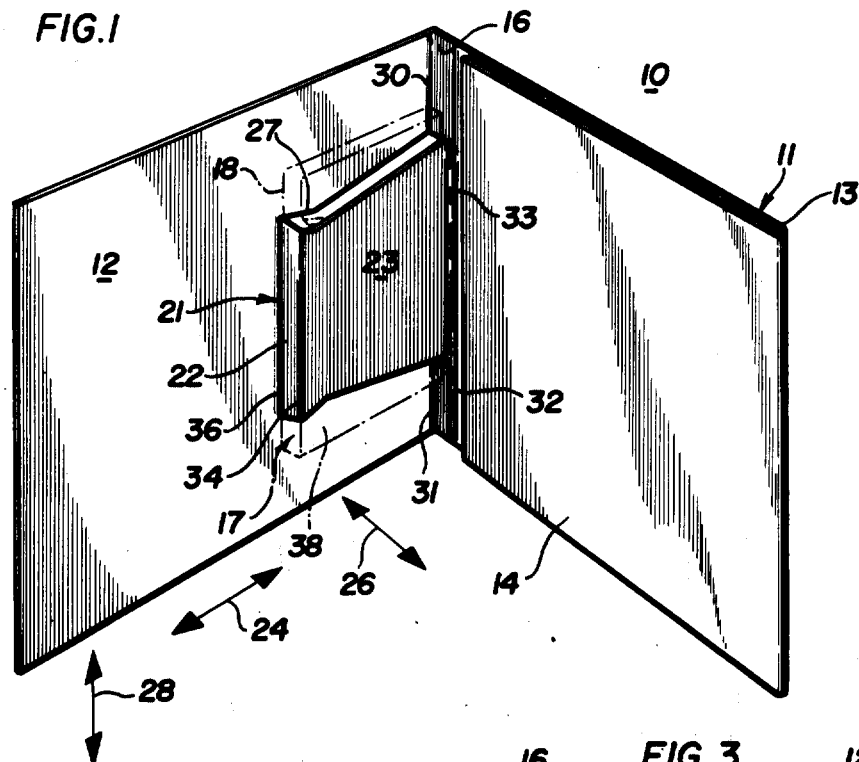
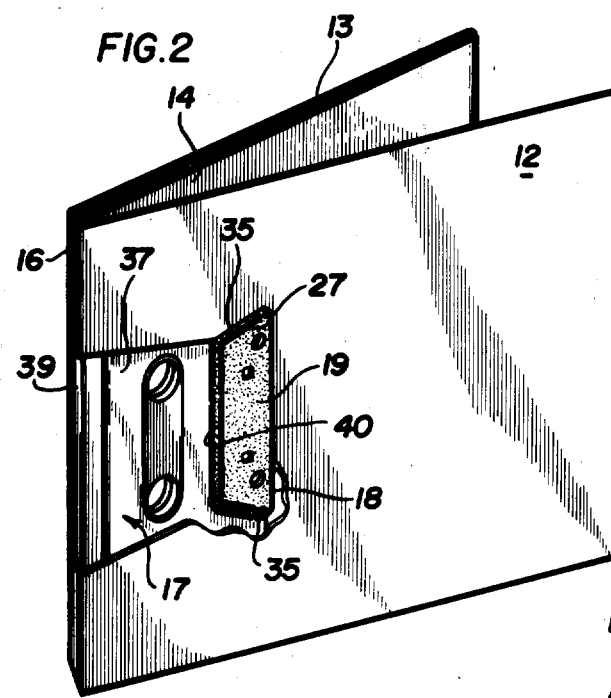
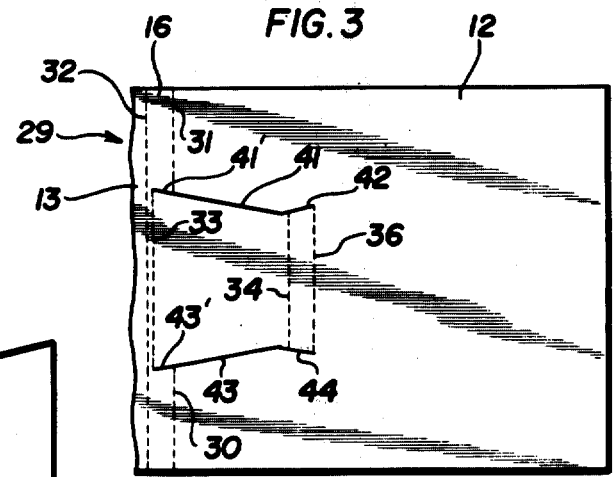
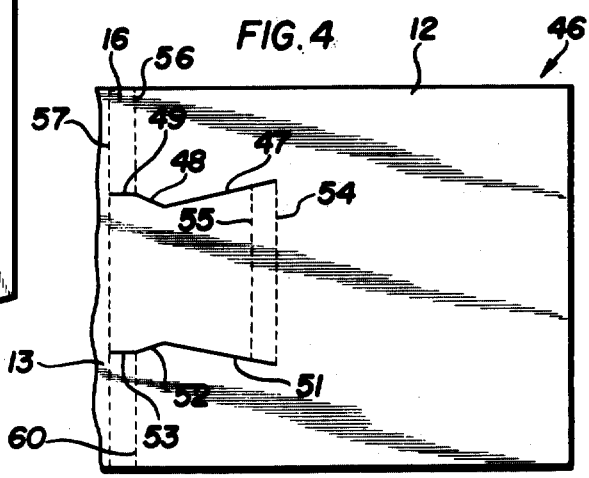

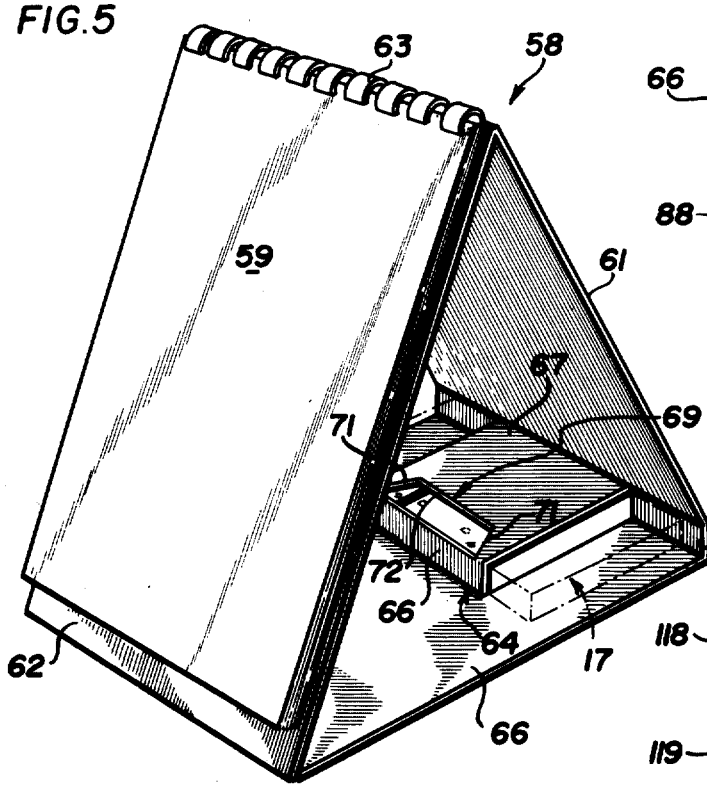
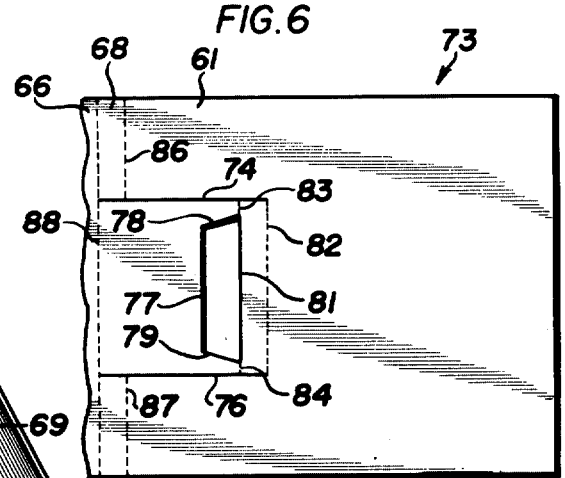
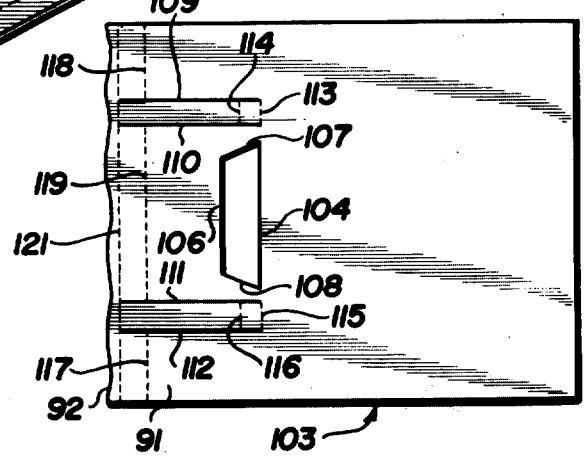
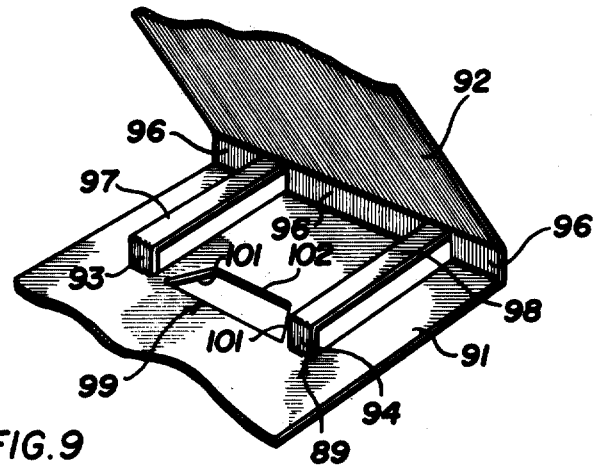
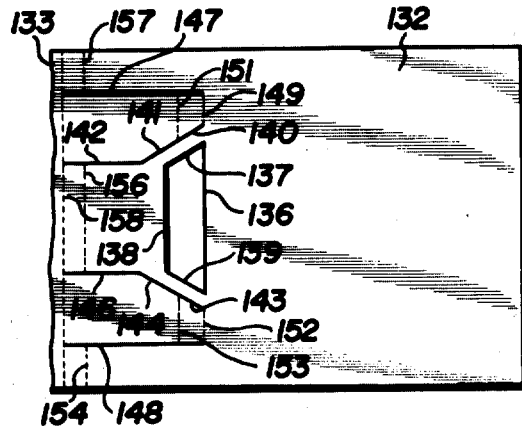
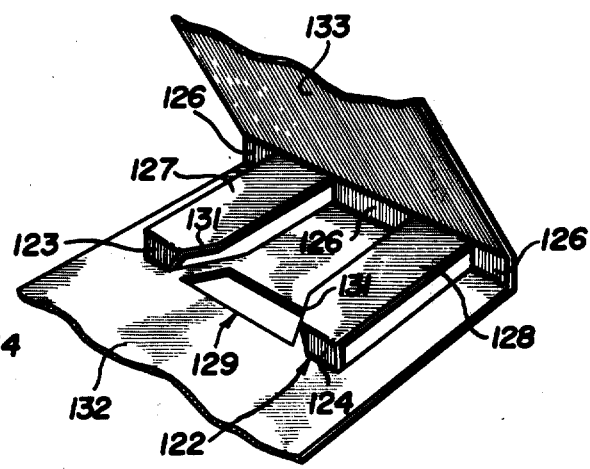

ARTICLE CARRIER

BACKGROUND OF THE INVENTION

It is generally recognized that the ability of an individual to absorb information, whether it be news, language or other information material, increases in direct relation to the number of facilities which the individual is required to exercise during the learning process. For example, it has been found that when a visual presentation is accompanied by an audio or sound presentation, the comprehension and retention of the material by the individual is greatly increased. Various means have previously been used to accomplish this result. Language records as well as children's records are frequently accompanied by a book which is used in conjunction with the records. In the case of language records, the audio presentation serves to provide the phonetic instruction and is keyed to the book which provides the visual presentation. Often, rather than supplying the audio message in the form of a record, a magnetic tape is provided together with the accompanying book or informational material. Also, such instruction is valuable for visual and audio training programs used by many employers.

A particular disadvantage of such an arrangement is that the book and recording tape or record are supplied as separate items. The items are individually stored, and frequently one or the other becomes lost or misplaced. Since the material from the two sources is effectively interrelated, the value of either is greatly reduced without the complementary material provided by the other.

This problem of separate packages has been somewhat overcome by combining the separate packages. However, the various attempts to do this provided a costly assembling of two separate packages. The patents which show this manner of combining visual material with tape cassettes are U.S. Pat. Nos. 3,503,141; 3,352,027; 3,553,851; and 3,583,729.

Therefore, an object of the present invention is to provide a simplified article carrier which can be formed from a single blank.

Another object of the present invention is to provide an audio-visual package which has visual material combined with a carrier formed from a single blank, and having means to prevent movement.

Another object of the present invention is to provide a blank having score lines and fold lines thereon which will provide a carrier when folded along the fold lines to prevent movement of an article in three of its major axes and providing front, rear, top, and bottom restraining walls.

It is also another object of the present invention to provide an article carrier for carrying and holding articles having a protrusion thereon comprising a front restraining member, a back restraining member, a top restraining member, a bottom restraining member all of which engage a portion of the article, a protrusion restraining member which engages at least a portion of the protrusion, and said front, back, top, bottom and protrusion restraining members all being permanently attached and arranged so that the article may be inserted and removed from the carrier without removing or detaching any of said restraining members.

It is also still a further object of the present invention to provide a blank deformable into a carrier for articles having at least one protrusion thereon, a first pair of fold lines spaced at predetermined distance apart to accommodate one end wall of an article to be carried, a second pair of fold lines spaced a predetermined distance apart to accommodate the opposite end wall of the article to be carried, score lines spaced a predetermined distance apart which are less than one dimension of the article to be carried, said score lines being in relationship to said first and second pair of fold lines to provide at least four restraining walls for the article to be carried when the blank is folded along said fold lines, and said score lines also providing a retaining wall to abut against one wall of protrusion of the article to be carried to substantially prevent movement of the article to be carried in three of its major axes.

It is still another object of the present invention to provide a blank deformable into a carrier for articles, said blank having a first fold line extending horizontally across said blank from one edge to the opposite edge of the blank, a first pair of score lines spaced apart a distance less then the width of said article and each having a first end adjacent said first fold line and a second end remote from said first fold line, said first pair of score lines extending in the same general direction generally transversely of said first fold line, and the vertical component of each being substantially equal to the thickness of the first end wall of said article, a second pair of score lines each extending from the second end of a separate one of said first pair of score lines and forming a continuous score line therewith and in the same general direction as said first pair of score lines, the vertical component of each of said second pair of score lines and its respective first score line being substantially equal to the width of said article, a third pair of score lines, each extending from the end of a separate one of said second pair of score lines which is remote from its respective first score line and forming a continuous score line therewith, and extending in the same general direction as said first and second pairs of score lines, the vertical component of each of said third pair of score lines being substantially equal to said thickness of a second end wall of said article which is opposite said first end wall, a second fold line extending from said one edge of said blank to said second end of the one of said first pair of score lines nearest said edge, a third fold line extending from said opposite edge of said blank to said second end of the other of said first pair of score lines, said second and third fold lines each being substantially parallel to said first fold line, a fourth fold line interconnecting said remote ends of said second pair of score lines, and a fifth fold line interconnecting the ends of said third pair of score lines which are remote from said second pair of score lines.

GENERAL DESCRIPTION OF THE INVENTION

This invention is directed to a carrier for articles, having protrusions thereon that are capable of engaging a retaining member and more specifically is directed to an article carrier which is formed from a single blank.

The invention will be described in conjunction with an audio visual informational system in which visual or graphic material is presented, ordinarily in booklet or leaflet form, with an associated tape cassette explaining or elaborating upon that which is illustrated in the booklet. It will be appreciated, however, as the description proceeds, that the invention is not limited to this use and, rather, is usable essentially any time it is desired to construct an article carrier out of a single blank, such as might be desirable, for example, as a sales promotional display or merely as a carrier for an article to be sold such as a cassette.

DESCRIPTION OF THE DRAWINGS

FIG. 1 shows an inside perspective view of an audio-visual system formed in accordance with the present invention;

FIG. 2 shows an outside perspective view of the system shown in FIG. 1;

FIG. 3 is a partial plan view of the system of FIG. 1 showing the cassette carrier as a blank;

FIG. 4 is a partial plan view of a modified blank used to form a cassette carrier;

FIG. 5 is a perspective view of another audio-visual system formed in accordance with the present invention;

FIG. 6 is a partial plan view of the system of FIG. 5 showing the cassette carrier as a blank;

FIG. 7 is a partial plan view of another carrier blank formed in accordance with the present invention;

FIG. 8 is a partial perspective view of a cassette carrier prepared from the blank of FIG. 7.

FIG. 9 is a partial plan view of another carrier blank made in accordance with the present invention; and FIG. 10 is a partial perspective view of a cassette carrier prepared from the blank of FIG. 9.

While the various features of this invention are hereinafter illustrated and described as being particularly adapted for providing a carrier for prerecorded tape cassettes, such as for example, in an audio-visual informational system and to various blanks which might be employed for carrying such tape cassettes it is to be understood that the various features of the invention can be utilized singly or in combination to provide a carrier for any number of other types and shapes of articles especially those which have protrusions enabling retention in the same manner as a cassette.

Referring to FIGS. 1 and 2, there is illustrated an audio-visual system 10 being formed of book for faller 11 having front and rear cover portions 12 and 13 with pages 14 of desired visual material attached in any suitable manner to the cover 13. Connecting the covers 12 and 13 is a bright or edge portion 16. In this embodiment, the covers 12 and 13 and back portion 16 are a single piece of paperboard, flexible plastic or similar material. The page 14 may be any suitable material and is generally to be associated with the audio portion recorded or to be recorded on a tape cassette 17. The contents of the recording and visual materal may be anything desired and are not a part of this invention.

The tape cassette 17 is a standard cassette which has a recording end 18 where exposed magnetic tape comes into contact with a recording or playing head. On both sides of the cassette at the recording end are raised trapezoidal protrusions 19. The thickness of the cassette is generally the same throughout, except for the trapezoidal protrusions. These trapezoidal protrusions being idential to each other. The shape of the cassette as noted above is standard, and is included herein for informational purposes. Any further detail as to the tape cassette is readily available by viewing those which are commercially available.

Attached to the cover portion 12 is a cassette carrier 21. The cassette carrier 21 comprises an end retraining wall 22, a top retaining wall 23, a back retaining wall formed by the back portion 16 and a bottom retaining wall formed by the inside of the cover 12. The walls of the carrier are all adapted to come into contact with the cassette to prevent the cassette from movement in directions shown by arrows 24 and 26. The carrier is also provided with retaining walls, edges or abutments 27 to prevent movement in the direction of arrow 28.

The carrier bottom retaining wall 12 is foldably connected to the end wall 16 by generally collinear fold lines 30 and 31, and the cover portion 13 foldably connected to the back 16 by fold line 32.

A portion of bottom wall and back wall are cut and folded in a manner to be more fully described below such that when back wall 16 is folded upwardly to be generally perpendicular to bottom wall 12 the generally rectangular-shaped article carrier 21 is provided for the cassette 17 consisting of the bottom wall 12, back wall 16, a top restraining wall 23 generally perpendicular to back wall 16 and foldably connected thereto along fold line 33, which may be collinear with fold line 32 if desired, and to the bottom wall 12 by fold lines 34 and 36, respectively.

In the configuration shown in FIGS. 1 and 2 with the carrier 21 ready to receive the cassette 17, the perpendicular distance between the top restraining wall 23 and bottom wall 12 will essentially be equal to the thickness of the cassette 17 at the back wall 16 and the thickness of the cassette minus the height of one trapezoidal protrusion 19 at the end wall 22. This, of course, is achieved by arranging the fold line 34 in parallel relation to the fold line 36 and spaced therefrom by a distance equal to the thickness of the cassette end 18 minus the height of one trapezoidal protrusion 19, and by arranging the fold line 33 parallel to the fold lines 30 and 31 and spaced therefrom a distance equal to the thickness of the cassette at its other end.

Retaining walls 22 and 23 form a cassette retaining sleeve having one end hingedly joined with front cover 12 on fold line 36 and its opposite end hingedly joined to bight or edge portion 16 on folding line 33 which is adjacent to rear cover 13.

It is to be appreciated, of course, that if an article of non-uniform thickness is to be carried by the carrier, the distance between the fold lines 34 and 36, and the fold line 33, and the fold lines 30, 31 would be modified accordingly to accommodate the varying thickness of the article. Although front restraining end wall 22 and back wall 16 are shown as being generally perpendicular to both the bottom wall 12 and the top restraining wall 23, as will be more apparent hereinbelow, other angular relationships may be employed depending upon the shape of the article being carried. This is to be understood for this embodiment as well as for other embodiments as hereinafter described.

By virtue of the foregoing, surface 37 of the cassette 17 is engaged by the bottom retaining wall 12 and the middle of a surface 38 of the cassette is engaged by top restraining wall 23. These opposed elements restrain the cassette 13 from movement in the vertical direction as indicated by an arrow 26. Similarly, the middle section of recording end 18 is engaged by front end wall 22 and opposed end portions of cassette non-recording end 39 are engaged by back wall 16 and, therefore, horizontal motion as indicated by an arrow 24 is also prevented.

In the preferred aspect of the present invention, the distance between the fold lines 34 and 36 and the distance between the fold line 33, and the fold lines 30 and 31 are choosen to exactly coincide with or are slightly smaller than the thicknesses described above so that the minimal elasticity which will be present will effectively wedge the cassette between walls 12, 23, 22 and 16.

In FIGS. 1 and 2, the visual instructional material is shown in the form of page 14 affixed to the inner surface of the cover portion 13. In this embodiment, since it is desired to have the cover portion 13 lie flat against top restraining wall 23, fold line 33 is offset from fold line 32 by a distance equal to the thickness of the pages 14. However this is not an essential feature in that, when the cover and carrier are made of flexible material such as paperboard, the flexible material allows the fold line 33 and 32 to be collinear.

As mentioned above, since tape cassettes are made by a number of different manufacturers and are to be employed with recorders made by still other manufacturers, it has been deemed necessary by the industry to standardize the size of such cassettes. For standard tape cassettes the dimensions have been set at approximately 3 and 15/16 inches long by 2 and ½ inches wide by 5/16 inches thick. In addition, to insure proper registration with the recording or playback heads of the records, such cassettes are manufactured with equal raised trapezoidal portions 19 on both surfaces 37 and 38 of the cassette adjacent the recording end 18 where an exposed portion of a recording tape is located. The raised trapezoids 19 have sides 35 converging from the end 18 to a top wall or abutment 40. The thickness of the cassette end 18 including both raised portions 19 is approximately 15/32 inch. To effect a more positive restraint against motion in the direction indicated by arrow 28, the bottom wall 12 is formed such that at least a portion thereof provides retaining edges 27 which are essentially congruent with sides 35 of the raised trapezoidal portion 19 when the carrier is assembled in the form shown in FIGS. 1 and 2. The foregoing is most clearly shown in FIG. 2.

In the embodiment illustrated in FIGS. 1 and 2 the front restraining end wall 22 serves also as a protective carrier against damage to the exposed recording tape on the cassette.

Referring to FIG. 3, there is illustrated a blank 29 in an unfolded or flat position. The blank has score lines as cuts 41, 42, 43, and 44 and fold lines 30, 31, 32, 33, 34 and 36. Score lines 41 and 43 converge from fold line 33 to form a trapezoid. The score lines 42 and 44 diverge from respective score lines 41 and 43, forming continuous score lines therewith, to fold line 36. The portion of score lines 41 and 43 extending between fold lines 33 and 30 and 31 have been indicated as 41' and 43' respectively. The trapezoid formed by the score lines 42 and 44 and the fold lines 36 is substantially equal to the cassette trapezoidal protrusion 19.

The length of the score lines 42 and 44 can be less or greater than the cassette trapezoidal ends 35 but must be sufficiently long to engage at least a portion of these ends 35 and preferably at least one-half of the length of each end 35. The fold lines 33, 34 and 36 have a length less than the length of the cassette. As shown in FIGS. 1 and 2, the fold lines 34 and 36 form the wall 22 and the fold lines 33 and 34 define wall 23. Fold lines 31, 30 and 32 form back wall 16 and extend horizontally from the sides of the covers 12 and 13.

Referring to FIG. 4 there is illustrated an embodiment substantially the same as that of FIG. 3 except in this embodiment, the retaining walls or abutments of FIG. 1 for retaining the cassette 17 from movement in the direction 28 will be adjacent the back wall 16, and shown as 48 and 52. In this embodiment, the magnetic tape will be exposed or a separate covering member for the magnetic tape will have to be used. For this reason, this is not generally the preferred configuration.

Also, in this embodiment, the fold line 33 is eliminated, in that the flexibility of the material used to form the booklet renders it unnecessary to provide space for the thickness of the reading material or display material 14. FIG. 4 illustrates a blank 46 in an unfolded or flat position. The blank has score lines 47, 48, 49, 51, 52, and 53 and fold lines 54, 55, 56, 57, and 60. The score lines 47 and 51 extend convergingly from the fold line 54 for a predetermined distance. The score lines 48 and 52 diverge from the score lines 47 and 51 to form trapezoidal ends which are substantially equal to the ends 35 of the cassette. The score lines 48 and 52 diverge to the fold lines 56 and 60. The score lines 49 and 53 extend from the score lines 48 and 52 respectively to the fold lines 57 and 60. The score lines 47, 48, and 49 are such that they form one continuous score line and the score lines 51, 52 and 53 are such that they form one continuous score line.

The fold lines 54 and 55 are sufficiently spaced from each other so that the distance therebetween is approximately equal to the thickness of the cassette (5/16 inches). The fold lines 54 and 55 extend between the score lines 47 and 51. The vertical distance of score lines 47 and 48 is approximately equal to the width of the cassette. This is the distance between fold lines 54 and 56.

The fold line 57 extends the entire width of the cover 12 and fold lines 56 and 60 are collinear and the distance therebetween is less than the thickness of the cassette recording end 18 and greater than the thickness of the cassette end 39 (approximately ⅜ of an inch). The distance between the score lines 47, 48 and 49 and score lines 51, 52 and 53 is less than the length of the cassette so as to provide support means for the cassette as hereinafter described.

When the blank 46 is folded to provide a cassette carrier, the fold lines 54 and 55 act to form one end restraining wall to engage cassette end 39 and the fold lines 56, 57 and 60 act to form the opposite retaining wall to engage cassette end 18. The score lines 48 and 52 are used to form retaining walls for the raised trapezoidal walls 35 on the cassette as is described in FIGS. 1 and 2 regarding the retaining wall 27.

As is understood, that although the trapezoid formed by the score lines 48 and 52 and the fold line 56 is substantially equal to the cassette trapezoidal raised protrusion 19. This, of course, may also be varied as was explained above with regard to FIG. 3.

Referring to FIG. 5, there is illustrated another embodiment showing an audio-visual booklet 58 having the visual pages 59 connecting to the covers 61 and 62 by an appropriate ring member 63. The booklet is adapted so that it may form a display stand as is illustrated in FIG. 5 for the pages 59 while the appropriate tape playing device is playing the cassette which was carried by a carrier 64. The carrier 64 is formed between the cover portions 61 and 66. The assemblage of the booklet 58 is of a known type and that per se will not be further described, in that it is evident from FIG. 5. The article carrier 64 has an end restraining wall 66, a top restraining wall 67, a back restraining wall 68, and a bottom restraining wall formed by the inside of the cover 66. The walls of the carrier are adapted to come into contact with the cassette 17 to prevent the cassette from movement in the directions noted by the arrows 24 and 26 in FIG. 1. The top wall 67 has a trapezoidal cutout 69 therein which is substantially equal to the trapezoidal raised portion 19 (FIG. 1) of the cassette. The trapezoidal cutout 69 has end retaining walls or abutments 71 on each end thereof which diverge inwardly from the end wall 66 in the same angular relationship as the ends 35 of the cassette trapezoid 19. The cutout 69 also has a top abutment 72 which in this instance is used to engage the cassette abutment 40. This abutment 72 acts as another supplemental retaining means for preventing movement in the direction of the arrow 24 (FIG. 1). However, it is of course, understood that if desired, the ends 71 may be extended so that the wall 72 will not come into engagement with the cassette abutment 40. The width of the walls 66 and 68 are substantially identical with each other and substantially equal to the thickness of the cassette, 5/16 of an inch. The length of the wall 67 is substantially equal to the width of the cassette. The width of the wall 67 is equal to the length of the wall 66 which is shorter than the length of the cassette and, of course, greater than the length of the cassette trapezoid 19.

This embodiment of the present invention permits a tighter engagement between the carrier 64 and the cassette 17 than the embodiment illustrated in FIGS. 1 through 4.

In FIG. 6 there is illustrated a blank 73 used to produce the carrier 64. The blank 73 is composed of covers 61 and 66. There are score lines 74, 76, 77, 78, 79, and 81 and fold lines 82, 83, 84, 86, 87, and 88. The score lines 74 and 76 have a length equal to the width and one thickness of the cassette. The score lines 77, 78, 79, and 81 are such that they are congruent with the cassette trapezoid 19 (FIG. 2). The fold lines 86, 87, and 88 provide the support wall 68 and the fold lines 82, 83, and 84 provide the support wall 66. The fold lines 86 and 87 are collinear and extend to the score lines 74 and 76, respectively from the edges of the cover.

The fold lines 83 and 84 are collinear with the score line 81. Score lines 77, 78 and 79 are used to form the abutments 71 and 72.

Referring to FIG. 8, there is illustrated still another cassette carrier 89 formed between covers 91 and 92. An end retaining wall for engaging the cassette is formed by two wall members 93 and 94 each having a height substantially equal to the thickness of the cassette (5/16 of an inch). A back retaining wall 96 which is illustrated in three separate sections and having a height approximately equal to the height of the cassette (5/16 of an inch). The top wall retaining portion of the carrier is also formed by two wall members 97 and 98 each having a length approximately equal to the width of the cassette.

As is evident by FIG. 8, the article carrier 89 is similar to the article carrier 64 illustrated in FIGS. 5 and 6. However, the article carrier 89 is such that the top wall 67 of article carrier 64 is replaced by the parallel top wall members 97 and 98 and the bottom wall, which is formed by the cover has the trapezoidal cutout therein. In FIG. 8 the trapezoidal cutout 99 has abutments 101 and 102 which are congruent with the configuration of the cassette trapezoid 19 and serves the same function as the trapezoidal cutouts 69 of FIGS. 5 and 6.

Referring to FIG. 7, there is illustrated a blank 103, which is formed by the covers 91 and 92 which are in a flat position. The blank is comprised of score lines 104, 106, 107, 108, 109, 110, 111, and 112 and fold lines 113, 114, 115, 116, 117, 118, 119, and 121. The score lines 104, 106, 107, and 108 are such that they provide a trapezoidal cutout which is congruent with the cassette trapezoid 19.

The fold lines 113 and 115 are collinear with each other and are collinear with the score line 104. The fold lines 114 and 116 are contiguous with each other and are substantially parallel to the fold lines 113 and 115 with the distance therebetween being approximately equal to the thickness of the cassette (5/16 of an inch).

The fold lines 113 and 114 and 115 and 116 are only across the score lines 109 and 110 and 111 and 112 respectively so as to provide therewith the retaining end walls 93 and 94.

The score lines 109 and 110 and the fold lines 114 and 121 define one of the top wall retaining members 98 and the fold lines 116 and 121 and the score lines 111 and 112 define the other top retaining wall 97.

The fold lines 117, 118, and 119 are collinear with each other and are parallel to the fold line 121 and are separated from the fold line 121 by a distance equal to the thickness of the cassette (5/16 of an inch) and also define the back retaining wall 96.

The article carrier 89 is formed by appropriately folding the blank 103 along its fold lines.

The article carrier 89 like the article carrier 64 provides a snug and tight fit for the cassette 17 (not shown).

Referring to FIG. 10, there is illustrated still another cassette carrier 122 which is composed of front retaining end walls 123 and 124, a back retaining wall 126 and top retaining walls 127 and 128 and a trapezoidal cutout 129 which is congruent with the cassette trapezoid 19. The top walls 127 define abutments or retaining walls 131 which are congruent with the ends 35 of the cassette trapezoid protrusion 19 (as illustrated in FIG. 2). The front retaining walls 123 and 124 and the back retaining wall 126 have a width which is approximately equal to the thickness of the cassette (5/16 of an inch).

The article carrier 122 is a one piece carrier formed between cover members 132 and 133. The article carrier is such that it tightly engages the cassette and provides both a top and bottom retaining means for engaging both the top and bottom cassette trapezoid end walls 35.

Although FIG. 5 shows wide top retaining walls 127 and 128, these retaining walls may be made in the form of strips as illustrated in FIG. 8 if so desired. Also, if it is desired to have the trapezoidal cutout 129 on the top wall, then a configuration similar to that of FIG. 5 will be used, however, it will be necessary to cut the wall portions such that the bottom wall will then have a retaining abutment or edge similar to abutment 131. The cutting of this will be better recognized in our description hereinafter of FIG. 9.

FIG. 9 illustrates a flat blank 134 which is made up of the covers 132 and 133 in their flat position. The blank has score lines 136, 137, 138, 139, 140, 141, 142, 143, 144, 146, 147, and 148 and fold lines 149, 151, 152, 153, 154, 156, 157, and 158. The score lines 136, 137, 138, and 139 are used to form the trapezoidal cutout 129 which will be congruent with the cassette trapezoid 19. The fold lines 149 and 152 are contiguous with each other as are the fold lines 151 and 153. This distance between the fold lines 149 and 151 which are parallel to each other and the fold lines 152 and 153 are approximately equal to the thickness of the cassette. The fold lines 154, 156, and 157 are colinear with each other and are parallel to the fold line 158. The distance between the fold lines 154, 156, and 157 is approximately equal to the thickness of the cassette. The score lines 141 and 144 converge from the inner ends of the fold lines 151 and 153. The angle of convergence and the distance between the score lines 141 and 144 are such that the score lines 141 and 144 form the abutments 131 which are used to engage the trapezoidal ends 35 (FIG. 2).

The score lines 140 and 143 are such that they diverge away from the ends of the fold lines 151 and 153 to meet the inner ends of the fold lines 149 and 152.

The score lines 140 and 147 and the fold lines 149 and 151 define the front retaining wall 124. The score lines 143, 148 and the fold lines 152 and 153 define the front retaining wall 123.

The score lines 144, 146, and 148 and the fold lines 158 and 153 define the top retaining wall 127 and the score lines 141, 142, and 147 and the fold lines 151 and 158 define the top retaining wall 127. The fold lines 158 and 157, 156, and 158, and 154 and 158, define the back retaining wall 126.

The article carrier 122 is formed by folding along the fold lines of the blank 134.

If it is desired, the article carrier 122 may be formed in a similar fashion to the article carrier illustrated in FIG. 5 wherein the top wall is formed by a single member.

Also, if desired, the top walls of the carrier illustrated in FIGS. 8 and 10 may extend to the edge of the covers.

The embodiments illustrated in FIGS. 5, 8 and 9 and their corresponding blanks of FIGS. 6, 7 and 10 may also be reconstructed so as to have the trapezoidal cutouts 69, 99 and 129 adjacent the back walls 68, 96 and 126 is such is desired. This type of embodiment is illustrated in FIG. 4.

The article carrier operates by, referring to FIGS. 1 and 2, sliding a cassette between the retaining walls 12, 22, 23, and 16 which are appropriately sized to tightly engage the cassette. As the cassette slides within these walls, the wall 12 slightly flexes in the area adjacent the retaining walls 27. As the cassette continues therein, the trapezoidal protrusion thereon will eventually snap into and be retained between the retaining wall 27.

To remove the cassette from the carrier, pressure is placed upon the trapezoidal protrusion to unsnap the trapezoidal protrusion from the retaining walls 27 and the cassette is then slid out of the carrier.

In the remaining embodiments, the snapping engagement between the cassette trapezoid 19 and the appropriate retaining members is also provided.

Although the invention has been described illustrating an audio-visual informational system utilizing a booklet made from flexible material which is relatively stiff, such as paperboard, plastic, sized or coated paper, etc., it is, of course, understood that the article carrier may, if such is desired, be made out of molded plastic and molded into its desired shape rather than being folded into it by way of a blank. The molded plastic however, should be flexible to accomodate the snap-in and snap release of the cassette from the carrier as described above.

In the instance where the article carrier is molded, the cover members 13 (FIGS. 1 to 4), 61 (FIG. 5), 92 (FIG. 8) and 133 (FIG. 10) may be eliminated if desired. The visual display material may be attached the cover member which helps form one of the retaining walls of the carrier if desired or this can be used as a cassette carrier alone without any visual material. Also, this is true of the carrier when made of paperboard, etc., if the carrier is to be used alone without any reading material or possibly only advertising material on the one cover member. This would be for display purposes. In this type of display member, the second cover member could be utilized or would be defined not as a cover member but as a member which would be wrapped around and glued or attached in a suitable manner to the article carrier or the first cover member. Also, if reading material is desired, this wrap around effect for the carrier could also be accomplished and another cover member being attached to the first cover member (to which the carrier is attached) and reading material if desired may be attached to any of the cover members.

It is to be understood that in this invention as described herein above and claimed hereinafter also applies to video-tape cassettes as well as the standard magnetic tape recording cassettes. Also, it is to be understood that the dimensions used in the specification to set forth the dimensions of the standard recording tape cassette are approximate dimensions, and were taken by sight reading the dimensions with an ordinary 12 inch rule. The dimensions are intended to show the relative dimensions of the cassette and are not intended to be exact dimensions. The exact dimensions can be determined, if desired, by using the appropriate measuring devices of the tape cassette. The video-tape cassettes are naturally larger but it is intended that they will have the same general structure as the magnetic tape cassette which is described above.

Although applicant has shown various embodiments of his invention, it should be understood that the details of the construction illustrated may be altered without departing from the scope and spirit of this invention.

I claim:

1. A display holder for a tape cassette or the like comprising a book-like folder body including front and rear cover portions and a bright portion interconnecting said cover portions, said front cover and bight portion having a pair of cuts formed therethrough generally normal to the bight portion and folding axes of said front and rear cover portions relative to the bight portion, corresponding ends of said cuts terminating within the front cover a substantial distance from the bight portion and the other corresponding ends of the cuts terminating adjacent said rear cover of the folder body, and a cassette embracing sleeve element integral with the folder body formed by said cuts and having top and bottom edges and a forward end hingedly joined with said front cover at the ends of the cuts which terminate in the front cover, the sleeve element having an opposite end hingedly joined with the folder body at the other corresponding ends of said cuts, and the sleeve element having a folding line spaced somewhat rearwardly of the forward end of the sleeve element by an amount approximately equal to the thickness of a cassette or the like to be held, and said folding line parallel to the hinge axes of the forward and rear cover portions, the arrangement being such that a cassette or the like is insertable beneath the sleeve element with one face of the cassette lying against the interior of the front cover and its opposite face lying under the sleeve element with the sleeve element folded on said folding line and offset rearwardly of the front cover, said one face of the cassette viewable through the front cover in the area between said cuts, and said cuts defining abutments on the front cover adapted to engage opposed edges of the trapezoidal protrusion on a cassette and thus to arrest movement of the cassette toward the top or bottom of the folder body, the sleeve element and said bight portion of the folder body preventing movement of the cassette away from the bight portion and away from the interior of the front cover.

2. A display holder for a tape cassette as set forth in claim 1, in which the abutments converge toward said bight portion to cooperatively engage with the particular tapered projection on one face of a cassette when said cassette has its projection adjacent the bight portion.

3. A display holder for a tape cassette as set forth in claim 1 in which the abutments diverge toward said bight portion to cooperatively engage with the particular tapered projection on one face of a cassette when said cassette has its projection remote from said bight portion.

* * * * *